Figure 1:
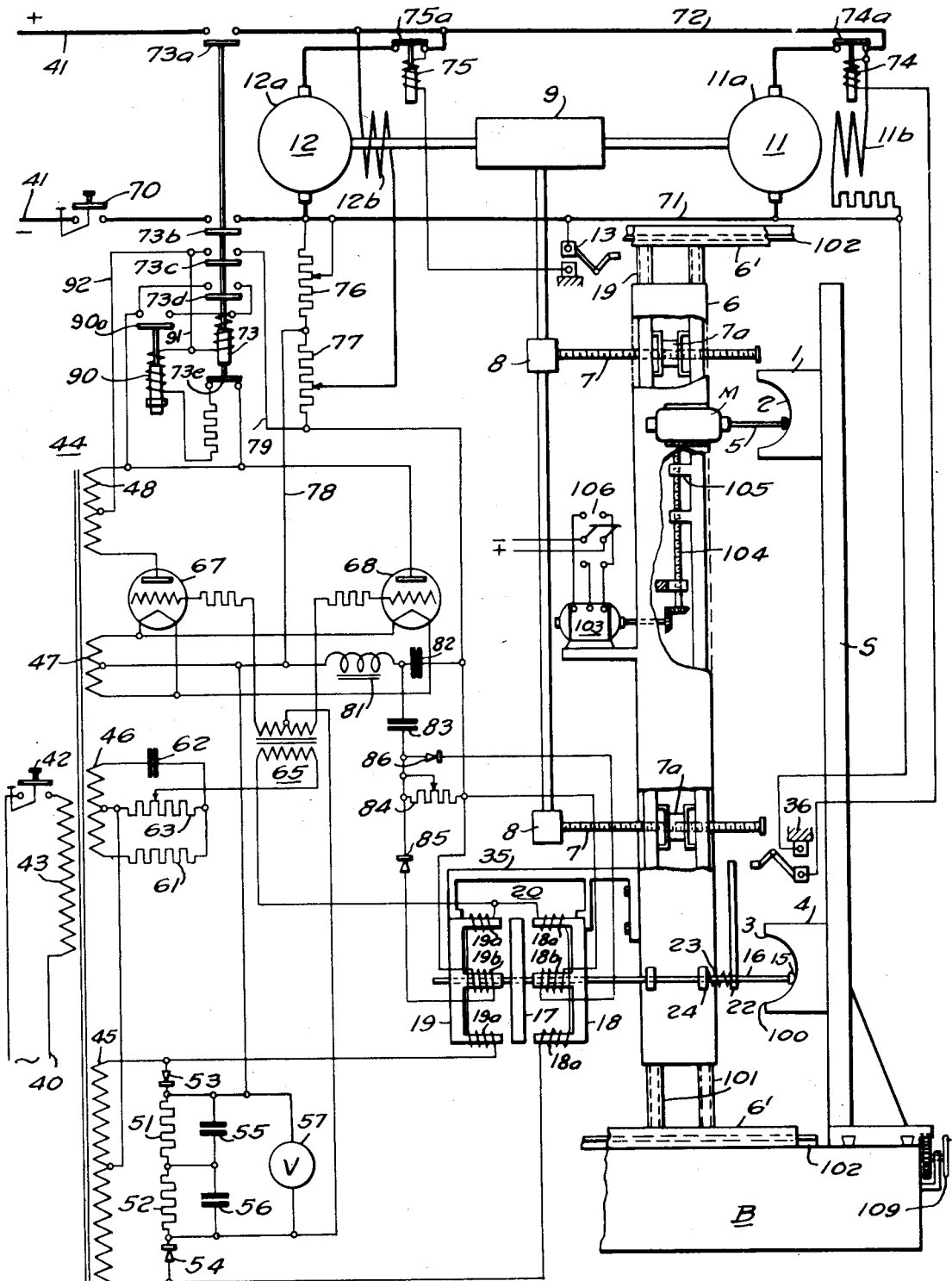

Jan. 5, 1943.   F. H. GULLIKSEN   2,307,503
PROFILING CONTROL SYSTEM
Filed May 25, 1938   2 Sheets-Sheet 1

WITNESSES:
E. A. McCloskey
J. S. Foster

INVENTOR
Finn H. Gulliksen.
BY
Paul E. Friedemann
ATTORNEY

Jan. 5, 1943.　　　F. H. GULLIKSEN　　　2,307,503
PROFILING CONTROL SYSTEM
Filed May 25, 1938　　　2 Sheets-Sheet 2

WITNESSES:　　　INVENTOR
　　　Finn H. Gulliksen.
　　　BY
　　　Paul E. Friedemann
　　　ATTORNEY Patented Jan. 5, 1943

2,307,503

UNITED STATES PATENT OFFICE 2,307,503

PROFILING CONTROL SYSTEM

Finn H. Gulliksen, Wilkinsburg, Pa., assignor to Westinghouse Electric & Manufacturing Company, East Pittsburgh, Pa., a corporation of Pennsylvania Application May 25, 1938, Serial No. 209,976

14 Claims. (Cl. 90—13.5)

This invention relates to control systems for machine tools, and particularly to a system for controlling a machine tool to work automatically upon a work piece, to reproduce a shape or contour on the work piece corresponding to a predetermined shape, according to the contour of a control template.

One object of the invention is to provide a control system for automatically controlling the movement of a tool with respect to a work piece, in order to shape the work piece according to a desired shape, as established by a control template.

Another object of the invention is to provide a profile control system in which a mechanical pick-up element or tracer controls an electrical system in accordance with the movement of the tracer along the contour surface of a template in order to reproduce a corresponding motion of the tool to shape the work piece to have a contour corresponding to the contour of the control template.

Another object of my invention is to provide a control system of the foregoing nature in which a tracer element, as it moves along the contour of a template, shall unbalance an electrical bridge in a system in which the unbalance controls the movement of a working tool with respect to the work piece.

A further object of the invention is to provide a simple anti-hunting system in the electrical bridge that controls the movement of the tool with respect to the work piece.

Another object of the invention is to provide a high speed response in the positioning of the tool, by a constantly operating mechanical differential system, actuated by two normally constantly operating electric motors, to control the movement of the tool with respect to the work piece.

In the employment of the system of the present invention, a work piece, that is to be shaped so as to have when finished, a desired contour, is mounted in fixed position upon a machine on which the work is to be done. As a guide in controlling the operation of the machine and the system, a template or profile element is located in fixed position with reference to the work piece and sufficiently close to the work piece, so that a movable carriage on the machine may support a tool to shape the work piece and also support a tracer element to engage the template or profile element.

A mechanical differential is provided to operate the carriage in such manner as to move the tool toward the work piece and to retract it from the work piece to shape the work piece in one direction or dimension. The second dimension is taken care of by other suitable means which may be controlled according to the present invention, or otherwise, as by a constant speed motor to move the carriage at right angles to the direction of tool movement. In similar fashion, the third dimension in the work piece may be formed by other suitable manually adjustable means, or by automatically operable equipment controlled according to the principle of the present invention, in the direction of the third dimention. The present description is intended to illustrate the principle of the invention and the manner in which it may be applied to shape the work piece in one dimension. From that description, the invention may then be applied, if desired, by one skilled in the art, to control the shaping of the work piece in the other dimensions.

The tracer element has the same shape and dimensions as the tool that is to shape the work piece, so that exactly corresponding movements of the tool may be established by the tracer and the control equipment, as the tracer moves along the contour surface of the template. The tracer is supported upon the same carriage that carries the tool. The tracer is normally biased to engage the template, and the movement of the tracer, with respect to a predetermined neutral or balanced position on the carriage, either in response to the biasing spring or against the biasing spring, controls a floating armature of an electromagnetic reactor bridge in such manner as to unbalance the bridge when the tracer moves away from its neutral position in the bridge, and from its neutral position with respect to the carriage. The unbalanced condition of the bridge initiates the energization of an electrical system, including electronic devices which are employed to control the supply of electric energy to an adjustable speed electric motor. This motor cooperates with a normally constant speed motor to control a mechanical differential device which moves the carriage and the tool to a position that will enable the tool to form a contour in the work piece corresponding to that in the profile element or template.

As the surface that is formed in the work piece by the tool gradually approaches the shape of the contour of the template, the carriage by its movement will then assume a position with respect to the armature connected to the tracer that will restore the armature to its normal neuforms a support or mounting for the cutter assembly 13. The plate 12 is a metal element and is permanently fixed to the stem 16. In the preferred construction the plate 12 is a flat, generally rectangular member cast or embedded in the underside of the stem 16 to be substantially flush with its surface 17. Spaced tabs or tongues 22 are bent laterally from the plate 12 and are embedded or cast in the material of the stem 16 to more securely fix the plate 12 to the stem. The opposite end portions of the plate 12 are thickened or pressed to have shouldered parts cast in the stem 16. The under sides of these end portions have polygonal flat-walled recesses 23. The recesses 23 are accurately shaped and positioned as they serve to locate the cutter assembly 13.

The cutter assembly includes a supporting block 24 adapted to lie against the underside of the mounting plate 12. The block 24 forms the carrier for the various elements of the cutter assembly 13. In the construction illustrated the block 24 is slightly narrower and slightly shorter than the plate 12 and is of substantial thickness. The cutter assembly 13 further includes end plates 25 engaged against the opposite ends of the block 24 and projecting downwardly or outwardly from the block. Inturned flanges 26 are provided on the upper ends of the end plates 25 and lie against the upper side of the block 24. The flanges 26 are shaped and proportioned to fit the recesses 23 of the plate 12 and their cooperation with the recesses 23 locates the cutter assembly 13 on the plate 12. Screws 27 are passed through openings in the flanges 26 and are threaded in openings in the block 24 to secure the end plates 25 in the block. The heads of the screws 27 are received in notches 28 in the ends of plate 12. Rivets or other securing devices may be employed in place of the screws 27. The outer extremities or lower ends of the end plates 25 are rounded or curved about a common axis extending parallel with the face of the plate 24 for the purpose to be hereinafter described.

The invention provides simple, yet very effective means for removably securing the carrier block 24 to the body stem 16 to tightly clamp against the mounting plate 12. This means includes a screw 29 threaded into an opening 30 in the central portion of the block 24 and extending upwardly through an opening in the mounting plate 12 and into an opening 9 in the stem 16. The opening 9 extends vertically through the stem 16 and the head or top of the screw 29 is adjacent its upper end. A screw driver slot 32 may be provided in the head or top of the screw 29. It will be apparent how the screw 29 may be turned to tightly clamp the block 24 against the plate 12 and how the screw may be rotated to release the block 24 for detachment.

The stationary blade 14 of the cutter assembly 13 is an elongate member trough-shaped or substantially U-shaped in transverse cross section. The blade 14 has spaced substantially parallel sides 33 and a curved portion 34 extending between and connecting the sides 33. The sides 33 are adapted to lie flat against the sides of the block 24 and are of substantial width to extend outwardly or downwardly from the block so that the curved portion 34 is a substantial distance from the under side of the block. The opposite ends of the stationary blade 14 may be substantially flush with the end plates 25 and the end plates, shaped as described above, provide or leave substantially semi-circular spaces 35 open at the opposite ends of the blade 14. The spaces 35 form outlets for the cut hair, etc. that may enter the stationary blade 14.

The stationary blade 14 is hingedly connected with the block 24 so that it may be swung downwardly or outwardly to expose the rotary blade element 15 and to permit easy cleaning, also inspection of the rotary blades and minor adjustment of its spring pressed bearings. The means for securing the blade 14 to the block 24 includes screws 36 passing through openings in the upper outer corner portions of the blade sides 33 and threaded in openings in the block 24. The screws 36 have heads at the outer surfaces of the blade sides 33 and form hinges or pivots for the blade. Rivets may replace the screws 36, if desired. Detent means is provided for releasably retaining the hinged or pivoted blade 14 in its normal operative position. The upper rear corner parts of the blade sides 33 are pressed or indented to have internal projections 37 and external indentations 38. The projections 37 cooperate with indentations 39 in the sides of the block 24 to releasably hold the hinged blade 14 in its normal operative position. When the blade 14 is in its normal position the upper edges of its sides 33 may engage against the under side of the mounting plate 12.

The curved portion 34 of the blade 14 is the active part of the stationary blade and is intended to be drawn or moved across the skin. A multiplicity of slots 40 is provided in the curved blade portion 34 to admit or receive the hair. The slots 40 extend transversely across the portion 34 from one side to the other and are preferably parallel slots. There is a large number of narrow slots 40 and the series of slots extends between points adjacent the opposite ends of the blade 14. In accordance with the invention the slotted active blade portion 34 has a thin wall so that the slots 40 have a minimum depth adapting the instrument to give a close shave. The outer surface of the portion 34 is ground off for a substantial circumferential distance and throughout the series of slots 40 so that the hair receiving slots occur in a very thin-walled part. In practice the ground off portion at the slots 40 may have a thickness of about .004 of an inch. The ground portion of the blade 14 has a smooth finished external surface adapted to readily move across the skin. In the preferred construction the ground part terminates at points spaced from the ends of the blade 14 leaving parts 41 of normal thickness which reinforce the blade. If desired a series of longitudinal slots 42 may be provided in one side 33 or both sides 33 of the blade 14 to allow the interior of the blade to be flushed or blown out with air or liquid.

Figure 2:
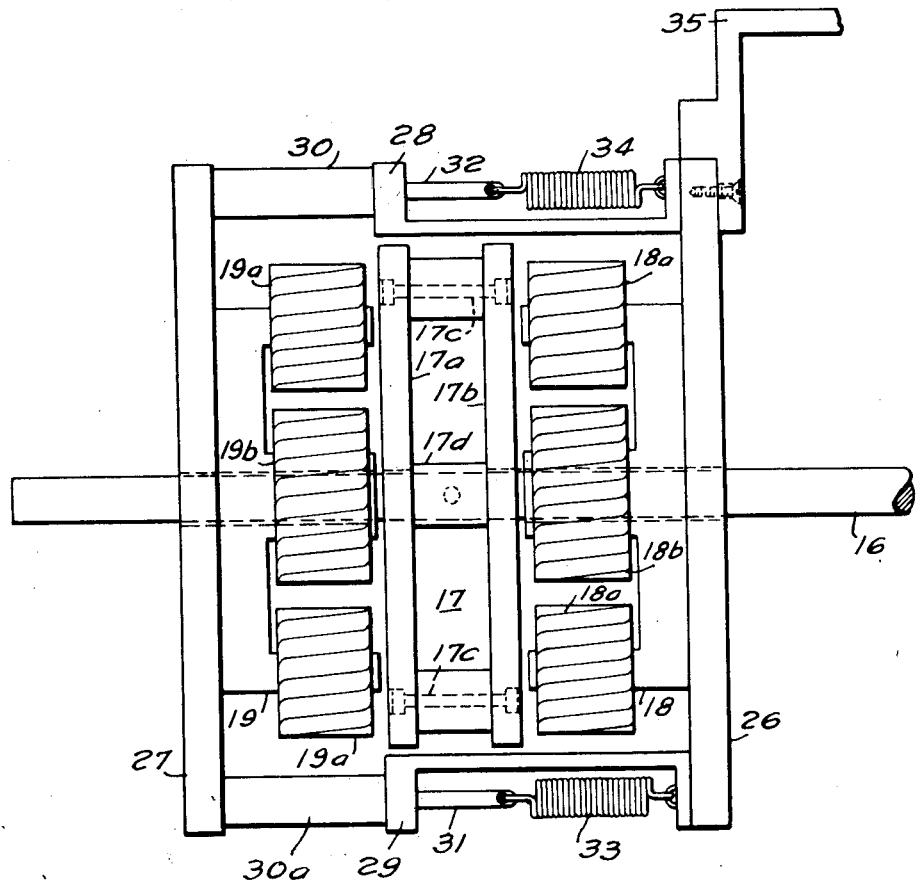

The rotary blade element 15 is housed within the stationary blade 14 and is cooperable with the internal surface of the blade portion 34 to cut the hairs received in the slots 40. The blade element 15 is an elongate member having one or more helical cutting vanes or blades 43. In the construction illustrated there are two blades 43. The edges of the blades 43 are finished or sharpened to have effective shearing cooperation with the internal surface of the blade portion 34. In accordance with the invention the slots 40 and the helical blades 43 are of a different inclination or pitch to cooperate in a manner to most efficiently cut the hair by a shearing action. Thus in the case illustrated it may be assumed that the slots 40 have a pitch of about 30° while the blades 43 have a pitch of about 32°. It is to be understood that The magnetic bridge 20, as shown in Fig. 2, comprises briefly, in addition to the two E-shaped core elements 18 and 19, and the movable armature 17, a stationary base 26 to support the core element 18 and a base 27 to support the core element 19. Two brackets 28 and 29 on base 26 serve as minimum space limiters between the two elements 18 and 19. Two extension rods 31 and 32 and tension springs 33 and 34 between the rods 31 and 32 and the stationary base 26 normally bias the two core elements 18 and 19 to their closest possible position as governed by the spacing brackets 28 and 29 and cooperating spacing bushings 30 and 30—a.

The armature 17 is preferably made up of two separate magnetizable bars 17a and 17b, held together as a unit by non-magnetic pins or screws 17c, and spaced by non-magnetic spacing elements 17d. The overall width of the armature should be such as to leave a small air gap on each side of the armature, between each armature bar and the adjacent core legs, when the armature is in its center neutral position and the cores are moved to their closest relative position.

The entire reactor unit, which constitutes the magnetic bridge, is mounted on a suitable bracket 35 that is fixed to the carriage 6.

The rod 16 which supports the tracer 15, extends through suitable bearings on the carriage 6 and through the middle legs of the reactor core elements 18 and 19 in such manner as to be free to move longitudinally with respect to the two core elements 18 and 19 in order to shift the armature 17 with respect to those two core elements.

Each core element is provided with three legs and is of substantially E-shaped, with the central leg sufficiently larger than either end leg to make up for the loss in area required to provide the space for the rod 16 to extend through the middle leg. Each of the two outer legs of core element 19 is provided with a magnetizing winding 19a and the middle leg is provided with a winding 19b. Similarly, the other core element 18 is provided with a winding 18a on each of the outer legs, and with a coil 18b on the middle leg. The two core windings 18a are cumulatively connected, and the two windings 19a are cumulatively connected, to energize and to magnetize the respective core elements with which they are associated.

So long as the armature 17 is in its neutral position, the air gaps between the armature and the respective core elements 18 and 19 will be the same and equal, and the reactive or impedance effect of each magnetic circuit and its associated windings 18a and 19a will be the same. When the armature 17 is moved closer to one core element and away from the other, the impedance effect of the first core element with its windings will be increased and the impedance effect of the other element and its winding will be decreased. Such variation in the impedance values is utilized to detect a change in position of the armature from its neutral balanced position.

As may be seen upon reference to Fig. 1, the bias spring 23 will tend to move the rod 16 and the tracer element 15 toward the right until the armature 17 engages the core 18 as a stop, unless the tracer in the meantime has engaged the contour surface 3 of the profile element or template 4. The resultant unbalanced condition in the reactor bridge 20 is then utilized to control the motors, in a manner that will be explained below, to cause the mechanical differential to operate the main carriage 6' to move it towards the right. In so doing, the tracer 15 engages the template and the movement of main carriage 6' will continue until the armature 17 is moved back to its normal neutral balanced condition between the two core elements. When the condition is established, the motors are so energized as to impart no further movement to the carriage 6'. If, as the carriage 6 is moved vertically upward, the tracer 15 engages the template 4 and is thus moved toward the left by the action of the profile surface 3, the armature 17 will then be moved against the core element 19 so that the bridge will be again unbalanced but in a reverse direction. Consequently, the motor 12 will again be energized, but in a direction to cause the movement of the main carriage 6' towards the left, to thus move the core element 19 away from the armature 17 until the core is then again placed in such position that the armature will be in its central or neutral position with respect to the two core elements.

We may now consider the electrical system in Fig. 1 by means of which the selective control of the motor 12 is established. As illustrated in Fig. 1, the energy for the system is derived from an alternating current circuit 40 and a direct current circuit 41. The direct current circuit may be derived from the alternating current circuit 40 by suitable rectifying means, but for the purpose of this description will be referred to as a separate direct current circuit.

Energy from the alternating current circuit 40 is supplied through a suitable switch 42 to the primary winding or windings 43 of a power transformer 44 for the control circuits. The transformer is illustrated as having four secondary windings respectively identified as 45, 46, 47 and 48. The secondary winding 45 supplies energy to the magnetic reactor bridge 20 which has already been described. For the purpose of checking the actual neutral balanced position of the armature during operation, two resistors 51 and 52 are provided that are connected between the terminals of the secondary winding 45 through two rectifier units 53 and 54, respectively. Two condensers 55 and 56 are connected to bridge the respective resistors 51 and 52. A voltmeter 57 with a zero center is connected across the outer terminals of the two resistor elements so that the voltage may be indicated in order to determine the neutral balance condition of the bridge.

The secondary winding 46 of the transformer 44 is utilized to provide voltage for a circuit including a resistor 61 and a condenser 62, to establish a voltage across a potentiometer resistor 63 that is in quadrature with the voltage of the secondary winding 46. Such quadrature voltage from the potentiometer resistor 63 is utilized in a manner that will be shortly described. The unbalanced voltage of the bridge is utilized to energize a grid control transformer 65 which, in turn, controls the excitation of the grids of two gas-filled discharge tubes 67 and 68 that serve to control the energization of the motor 12.

The gas-filled discharge tubes are of a type well known in the art, and embody a filamentary cathode, an anode and a control grid in a sealed envelope within which a suitable gas or other ionizable material is included to provide a conducting medium between the main elements, the cathode and the anode.

These tubes become conductive when the plate voltage reaches, and exceeds, a predetermined critical value if the grid element is not energized to exercise preventive control. To control the tubes, the grid may be energized by a voltage whose value relative to the critical voltage and whose phase relation to the plate voltage will be such as to render the tube conductive at any selected point of an impressed alternating voltage. By such control, the tube can be caused to rectify and conduct any selected percentage of a full current wave.

To provide the proper starting bias on the grids, a direct current voltage from the resistors 51 and 52 is introduced between the transformer secondary winding 47 for the tube filaments and the unbalance transformer 65 to the grids of the tubes.

The secondary transformer winding 47 is provided to heat the filamentary cathodes of the tubes 67 and 68.

The secondary transformer winding 48 is provided as a source of energy which is to be controlled by the tubes 67 and 68 and to be transmitted by them to control the excitation of the motor field winding of the motor 12.

A suitable switching device 70 connects the direct current circuit 41 to two main conductors 71 and 72, through the contacts 73a and 73b of a relay switch 73. The relay switch 73 is shown, at the top of the diagram, as energized from the transformer secondary winding 48 through a starting time-limit relay 90. The armature 11a of constant speed motor 11 is connected between the bus conductors 71 and 72 through the back contact 74a of a relay device whose winding 74 is connected between the buses 71 and 72 through a limit switch 36 mounted on the base B adjacent the arm 22 on the tracer rod 16. The field winding 11b of the constant speed motor 11 is connected between direct current bus conductors 71 and 72.

The armature 12a of the adjustable motor 12 is connected between bus conductors 71 and 72 through a back contact 75a of a relay whose operating winding 75 is connected between buses 71 and 72 through the limit switch 13 adjacent the upper part of the carriage 6'. The field winding 12b of motor 12 is connected between the buses 71 and 72 through an adjustable rheostat 76 in series with a selected portion of a range-adjusting potentiometer resistor 77. The range-adjusting resistor 77 is connected to be energized by the tubes 67 and 68 to provide a potential in the circuit of the field winding 12b of the motor 12 that will add to the voltage between the bus conductors 71 and 72 and thereby control the excitation of the field winding of motor 12 to diminish the speed of the motor. As shown, the one terminal of the range-adjustment resistor 77 is connected to a mid-point tap of the heating secondary winding 47 through a conductor 78, and the other terminal of the range-adjusting resistor 77 is connected through a conductor 79 to a mid-point of the power secondary winding 48 through a front contact 73c of the relay 73.

In order to provide an anti-hunting circuit for the magnetic reactor bridge 20, an inductive impedance 81 and a condenser 82 are connected in series between the terminals of the range-adjusting resistor 77. The condenser 82 is bridged by a circuit including a condenser 83 in series with an adjustable potentiometer resistor 84. The resistor 84 is bridged by both windings 18b and 19b on the middle legs of each of the cores of the reactor bridge 20. One winding is connected across the resistor 84 through a rectifier 85 conductive in one direction; and the other winding is connected across the resistor 84 through a rectifier 86 conductive in the opposite direction.

We may now proceed to a consideration of the manner in which the control system operates to control the excitation of the field winding 12b of the motor 12 in order to control the position of the carriage 6' which supports the carriage 6 and thus the tool 5 that engages the work piece 1.

When the system is first connected to the alternating current supply circuit 40 by the closure of switch 42, the primary transformer winding 43 is energized and the secondary windings are also immediately energized. The secondary winding 45 energizes the bridge 20; the secondary winding 46 energizes the potentiometer biasing resistor 63 for the unbalance and grid bias transformer 65; the secondary winding 47 heats the cathodes of the tubes 67 and 68; and the secondary winding 48 energizes the time-limit starting relay 90 through the back contacts 73e of relay 73. The relay device 90, after a short predetermined time interval, closes its front contact 90a to complete the energizing circuit of the winding of switch relay 73. This circuit proceeds from top terminal of secondary winding 48, through relay switch 90a, coil of relay 73, and conductors 91 and 92 to the middle terminal of secondary winding 48. Relay 73 thereupon operates to close contact members 73d to establish its own holding circuit and operates to open its back contact 73e to disconnect the relay 90. Contact members 73c are also closed to complete the circuit from the mid-point of the secondary winding 48 of the transformer to the conductor 79 leading to the potentiometer resistor 77. Relay 73 also, at the same time closes its front contact members 73a and 73b connecting the bus conductors 71 and 72 to the direct current supply circuit 41. The system is now energized and ready to function.

Upon closure of the contacts 73a and 73b connecting conductors 71 and 72 to the direct current supply circuit, armature 11a of motor 11 becomes energized if the limit switch 36 is open. This condition will be assumed for the present.

If the switch 106 is closed to operate the motor 103 in such a direction to move carriage 6 vertically upward and the tracer 15 is positioned at the lower vertical portion of the template 4 and the bridge 10 is adjusted to be balanced, then nothing will happen to change the horizontal position of tool 5, that is, carriage 6'. Under these conditions, motors 11 and 12 are adjusted to operate at the same speed with the result that differential 9 transmits no motion to lead screws 7.

As soon as tracer 15 is moved vertically to the point 100 of the profile contour surface 3 of template 4, spring 23 will force the tracer 15 towards the right as far as the contour surface 3 will permit. Such movement will be sufficient to move the armature 17 towards the core 18 of the magnetic reactor bridge 20. The impedance relations between the windings on the two cores 18 and 19 will thereupon become unbalanced, and the unbalance voltage, between the mid-point of the transformer secondary winding 45 and the juncture of the reactor windings 18a and 19a, will energize the primary winding of unbalance transformer 65. Such unbalance voltage between the mid-point of the transformer secondary winding 45 and the juncture of the bridge windings 18a and 19a, will be dependent upon the extent of unbalance, which in turn, will depend upon the amount of deviation of the armature from its normal neutral balanced position.

During all this time, from the moment when the main transformer 44 was initially energized, the transformer secondary transformer 46 energizes the biasing resistor 63 to set up a voltage in that resistor in quadrature with, or displaced 90 electrical degrees from, the voltage across the secondary winding 46. A portion of such quadrature voltage along the resistor 63 was selected to provide a sufficient and proper voltage when transmitted through the unbalance transformer 65, to bias the grid elements of the tubes 67 and 68, so those tubes would be rendered conductive at the mid-point of the voltage wave supplied to the tubes from the transformer secondary winding 48. Such condition would exist at all times during normal balanced conditions in the magnetic bridge 20. Each of the two tubes 67 and 68 would thus transmit one-half of each current wave to energize the range-adjusting resistor 77 in the circuit of the field winding 12b of the motor 12, under normal balanced conditions in the magnetic bridge 20. Such conditions would exist when the tool and the tracer are in equivalent corresponding positions. The range-adjusting resistor 77 in the circuit of the field winding 12b would thus be energized through the tubes 67 and 68 by one-half of the current wave of each polarity.

Upon the occurrence of an unbalanced condition, such as previously referred to in the magnetic bridge 20, due to the movement of tracer 15 towards the right by the biasing spring 23, and the consequent unbalancing of the bridge, the unbalance voltage across the bridge becomes impressed upon the biasing transformer 65 and is algebraically added to the quadrature biasing control potential from the resistor 63 in such manner as to modify the effective phase relation of the basing voltage on the grids of the tubes 67 and 68 with respect to the main impressed voltage from the secondary winding 48. That phase angle should be such as to control the tubes 67 and 68 to shift the critical conducting point so that the current as supplied by those tubes to the resistor 77 would be modified. The voltage across resistor 77 would be modified and the voltage across part of the resistor 77 would correspondingly modify the excitation of the field winding 12b of motor 12, to cause the motor 12 to operate in a direction that would eventually establish a resulting movement of the tool 5 also in a right-hand direction against the work piece to correspond to the movement of the tracer 15 as already established by the biasing spring 23.

Let us reconsider for a moment the action in connection with the two motors 11 and 12 in controlling the position of the tool 5 with respect to the work piece 1. The motor 11 operates continuously at a constant speed. While conditions are balanced, that is, while the tool is in a position corresponding to the position of the tracer, the motor 12 will also operate at a speed corresponding to that of motor 11, and there will be no resulting torque established in the mechanical differential 9. Such condition will, of course, have been established in the beginning when the entire system was set up, by the adjustment of the field rheostat 76 and of the range-adjusting resistor 77 in the circuit of the field winding 12b of the motor 12, under normal balanced conditions. When the tracer advances towards the right against this template, the tool is to follow. Let us assume that the set-up of the mechanical arrangement is such that motor 12 must be retarded in order that the resultant torque and the direction of movement in the mechanical differential will cause the lead screw 7 to advance the tool 5 in the same right-hand direction. Thus, to move the tool towards the right, the speed of motor 12 should be diminished below that of motor 11. Conversely, to retract the tool in a left-hand direction, the speed of motor 12 should be increased above that of motor 11.

Returning now to the consideration of the operation of the discharge tube 67 in controlling the field winding of motor 12 for the condition originally considered, the tracer element is moved to the right. The tool is to follow in the same direction. The speed of motor 12 should, therefore, be diminished. In order to diminish the speed of motor 12, the excitation of field winding 12b should be increased. The resistor 77 is so connected in the circuit of the field winding 12 as to introduce a voltage opposite in effect and, therefore, differentially effective between the conductors 71 and 72 since conductor 72 will be positive and conductor 71 will be negative as indicated in the diagram. In order to increase the excitation of field winding 12b, the voltage across resistor 77 should be decreased so that the voltage drop across a portion of the resistor 77 will be diminished. That obviously requires that less current be transmitted through the resistor 77. Consequently, the unbalance voltage established in the magnetic bridge 20, when the armature 17 moves toward the core 18, should be such as to combine with the quadrature voltage of the resistor 63 to cause the control voltage applied to the grids of the tubes to lag still more than 90° and thus retard the time at which the tubes 67 and 68 will become conductive to transmit current to the resistor 77 in the circuit of the field winding of motor 12.

When the reverse conditions are to be established that is, when the tracer is moved in a left hand direction, the tool is to be withdrawn from the work piece also in a left-hand direction. Under those conditions, the unbalance voltage that results when the armature moves toward the core 19 will combine with the quadrature voltage of resistor 63 in such direction as to diminish the phase angle lag between the grid voltage and the anode voltage so that the current supplied by the tubes to the resistor 77 will be increased and the differential voltage in the circuit of the winding 12 correspondingly increased to diminish the excitation of the winding of that motor 12. The motor speed will be correspondingly increased so that the differential motion and torque of the differential mechanism 9 will be operated in such direction as to rotate the lead screws 7 to move the carriage 6' to the left.

Since the magnetic bridge 20 is in itself a rather sensitive device, it would ordinarily have a tendency to establish a hunting condition in the control of the carriage, as the carriage tends to restore the armature to its neutral position. In order to establish an anti-hunting action, the middle windings 18b and 19b on the two cores are utilized to introduce an anticipatory electromagnetic flux control in the corresponding cores, in such manner as to indicate a condition of balance in advance of actual balance, after the discharge tubes 67 and 68 have been energized to transmit the control energy to the resistor 77, but before the readjustment has been fully and completely effected by the two motors.

The action is thus such as to introduce a high speed sequential control of the following nature, namely, first, upon the occurrence of unbalance the tubes are controlled to transmit restoring energy in the proper direction necessary to control the motor 12; second, such energy is transmitted to the resitor 77 by the two tubes; and, third, the voltage across the resistor 77 energizes the inductive reactor 81 and the condenser 82 to control the excitation of the middle leg windings.

The condenser 82 will normally be charged to an extent depending upon the steady state condition of energization of the resistor 77 when the system is in a condition of balance. When the bridge becomes unbalanced, the change in the energy supplied to the resistor 77 will correspondingly change the energy charge of the condenser 82. For example, when the voltage across the resistor 77 is increased by an increased current, the condenser 82 will be increasingly charged. When the current is diminished, the voltage across the resistor will be correspondingly diminished and the condenser 82 will discharge to a corresponding degree.

Such change in the charge and in the discharge of the condenser 82 causes a similar change in the charge and in the discharge of the anti-hunting condenser 83, and such discharge or recharge of energy in condenser 83 establishes a voltage which correspondingly energizes the appropriate winding 18b or 19b through the selectively disposed rectifiers 85 and 86.

The middle leg windings 18b and 19b and the rectifiers that control them are so arranged as to energize that winding 18b or 19b that is on the core towards which the armature 17 is moved by the tracer. The movement of the armature toward a core increases the impedance of that core and thus unbalances the bridge. Instead of permitting that entire unbalance, however, to control the change in the excitation of the field winding, the resulting change in condenser charge is utilized to energize the anti-hunting winding on the core that is being approached by the armature. That winding, when energized, decreases the impedance of the core, and to some extent balances out some of the increase in impedance which the armature approach would normally establish. All this anti-hunting action is effective before the field winding becomes energized, due to the delay introduced by the field winding constants. The field winding excitation is thus changed gradually in increments rather than in one large impulse.

By means of the two windings 19a and 19b that are thus energized in advance of the actual mechanical balancing of the bridge, an anti-hunting control is provided that prevents overshooting or hunting in the operation of the system.

In a system of this type, it is, of course, desirable to be able to determine the actual point of balance, irrespective of the changing operations and the changing visual positions of the elements. For that purpose, the voltmeter 57 is provided in connection with the resistors 51 and 52 and the condensers 55 and 56. The voltmeter 57 will at all times show whether the bridge circuit is balanced or unbalanced and the direction and extent of unbalance, if any.

In the foregoing part of the specification I have described mainly the manner in which the tool motion is controlled to correspond to the motion of the tracer in one dimension in one plane. For the other dimension of that plane, the constant speed motor moves the carriage in such other direction. The shaping tool thus forms the contour on the work piece within one plane. When that plane is shaped, the support S for the template and the work piece is advanced a short distance in a direction perpendicular to the cutting plane by a hand wheel and rack 109. The cutting operation is then repeated in such new advanced position and the process is continued progressively until the contour of the template in all three dimensions is reproduced on the work piece.

The purpose of the limit switches 13 and 36 is to prevent excess movement of the carriage in either direction, and thereby prevent jamming.

My invention is not limited to the specific details that I have shown nor to the specific arrangement of the various elements, since they may be replaced by equivalent devices and variously modified both as to structure, individual operation and arrangement without departing from the spirit and scope of the invention, as set forth in the appended claims.

I claim as my invention:

1. In a profiling control system, the combination with a control template, a tracer to follow the contour of the template, a work holder for a work piece, a tool to shape the work piece, a carriage for the tool, and motive means for moving the carriage to move the tool against the work piece to shape it according to the contour of the control template; of means for controlling the motive means to move the carriage and the tool according to the guide surface of the control template; said means comprising an electrical impedance bridge including two magnetic cores each having a coil wound thereon, each coil representing one leg of the bridge, armature means mechanically secured to the tracer to move between said cores to unbalance the bridge, and means responsive to the bridge unbalance for controlling the motive means to move the carriage to a position where the location of the tool will correspond to the location of the tracer and where the bridge will become balanced again, and anti-hunting means for prematurely introducing a restorative balancing force into the bridge, as it approaches balanced condition, to prevent hunting.

2. A profile control system for shaping a work piece, comprising a tool to shape the work piece, a template having the contour to be established in the work piece, a Wheatstone bridge including two impedance arms, a tracer movable to follow the contour of the template and having a magnetic element secured thereto to cause relative change in the impedances of said impedance means and operative to establish a control function to cause corresponding movement of the tool, and means including supplementary impedance coils also associated with said magnetic element and responsive to the control function set up by the movable tracer for establishing an anti-hunting control upon the movement of the tool.

3. A profile control system for shaping a work piece, comprising a tool to shape the work piece, a template having the contour to be established in the work piece, a tracer to follow the contour of the template, means including an armature mechanically secured to said tracer, responsive to movement of the tracer, means controlled by said tracer-responsive means to move the tool, means responsive to said tool-moving means including a saturable reactor and a condenser serially connected thereto which is charged at a rate proportional to the rate of movement of said tracer to impose an anti-hunting force upon the tracer-responsive means.

4. A profile control system for shaping a work piece, comprising a tool to shape the work piece, a template having the contour to be established in the work piece, a tracer to follow the contour of the template, means including an armature mechanically secured to said tracer, responsive to movement of the tracer, means to move the tool, means for energizing said moving means, means controlled by the tracer-responsive means for controlling the energizing means, and means responsive to the energization of the tool-moving means including a saturable reactor and a condenser serially connected thereto which is charged at a rate proportional to the rate of movement of said tracer for introducing an anti-hunting control action into the tracer-responsive means.

5. In a profiling system in which a tool is operated to shape a work piece according to a template, the combination with a motor for moving the tool relative to the work piece according to the contour of the template, and a field winding for said motor, of resistance in the circuit of the winding to control the speed of the motor by varying the field excitation, means for checking the actual position of the tool, relative to its theoretical proper position as outlined by the template contour, at a high rate of speed comparable to the frequency of a standard alternating-current light circuit, means responsive to progressive variations in the path of the tool, and means responsive to such variations for supplying energy impulses to the motor through said resistance, at the tool-checking speed, to cause the motor to move the tool only to the extent of the progressive variation in the direction of the tool path and means whereby the corrective energy impulses supplied to the motor field winding establish an anti-hunting influence on the variation-responsive means, said last mentioned means including a condenser which is charged at a rate proportional to said variations.

6. In a profiling system, the combination with a tool to shape a work piece, a template to establish the contour to be shaped by the tool, and a movable carriage for the tool, of a tracer on the carriage to engage the template and to serve as a proper position-detecting device for the tool; means responsive to movement of the tracer along the template, said means comprising balanced electromagnetic impedance devices connected as two arms of a Wheatstone bridge, and a magnetizable member mechanically coupled to said tracer and movable between the two impedances in response to tracer movement; motive means for the carriage including a constant speed motor, a variable speed motor, and a differential mechanism between the two motors for moving the carriage; and means responsive to unbalance of the Wheatstone bridge for controlling the variable speed motor to enable the differential mechanism to respond quickly to move the carriage and the tool according to the movement of the tracer along the template and anti-hunting means including a pair of inductance coils whose relative impedance is affected by said movement of said magnetizable member.

7. In a profiling system, the combination with a tool to shape a work piece, a template, a tracer to engage the template, and a carriage for the tool and the tracer; of a Wheatstone bridge including two electromagnetic impedance devices as two arms of the bridge, a movable magnetizable member directly movable by the tracer to unbalance the two impedance devices, a motor provided with a shunt field winding to control the movement of the carriage, means controlled by the bridge unbalance to supply corrective energy to the motor field winding, and means including a condenser having a charging rate responsive to such corrective energy for controlling the impedance devices to establish an anti-hunting control action.

8. In a profiling system, the combination with a tool to shape a work piece, a template, a tracer to engage the template, and a carriage for the tool and the tracer; of a Wheatstone bridge including two electromagnetic impedance devices as two arms of the bridge, a movable magnetizable member directly movable by the tracer to unbalance the two impedance devices, a motor provided with a shunt field winding to control the movement of the carriage, means controlled by the bridge unbalance to supply corrective energy to the motor field winding, an auxiliary winding associated with each impedance device, and anti-hunting means for transmitting energy impulses to the auxiliary windings in accordance with the corrective energy supplied to the motor field winding.

9. In a profiling control system, the combination with a control template, a tracer to follow the contour of the template, a work holder for a workpiece, a tool to shape the workpiece, a carriage for the tool, and motive means for moving the carriage to move the tool against the workpiece to shape it according to the contour of the control template; of means for controlling the motive means to move the carriage and the tool according to the guide surface of the control template; said means comprising an electrical impedance bridge including two magnetic cores each having a coil wound thereon, each coil representing one leg of the bridge, armature means mechanically connected to the tracer to move between said cores to unbalance the bridge, and means responsive to the bridge unbalance for controlling the motive means to move the carriage to a position where the location of the tool will correspond to the location of the tracer and where the bridge will become balanced again, and means for prematurely introducing a balancing force into the bridge, as it approaches balanced condition, to prevent hunting, said last-named means comprising a saturable reactor and serially connected condenser, the latter of which is controlled by movements of said armature and charged proportionately to the extent of such movements, and an auxiliary coil also mounted on one of said magnetic cores and whose energization is controlled by the charge of said condenser so as to introduce an anti-hunting control action.

10. In a profiling control system, the combination with a control template, a tracer to follow the contour of the template, a work holder for a workpiece, a tool to shape the workpiece, a carriage for the tool, and motive means for moving the carriage to move the tool against the workpiece to shape it according to the contour of the control template; of means for controlling the motive means to move the carriage and the tool according to the guide surface of the control template; said means comprising an electrical impedance bridge including two magnetic cores each having a coil wound thereon, each coil representing one leg of the bridge, armature means mechanically connected to the tracer to move between said cores to unbalance the bridge, and means responsive to the bridge unbalance for controlling the motove means to move the carriage to a position where the location of the tool will correspond to the location of the tracer and where the bridge will become balanced again, and means for prematurely introducing a balancing force into the bridge, as it approaches balanced condition, to prevent hunting, said last-named means comprising a saturable reactor and serially connected condenser, the latter of which is controlled by movements of said armature and charged proportionately to the extent of such movements, and an auxiliary coil also mounted on one of said magnetic cores and whose energization is controlled by the charge of said condenser so as to introduce an anti-hunting control action, said magnetic cores being E-shaped and in confronting relationship with the respective bridge impedance coils wound on the outermost legs and the respective auxiliary coils mounted on the central legs.

11. In a control system for apparatus having a controlling element, a controlled element and motive means for driving said controlled element in accordance with displacement of said controlling element, the combination with an electrical bridge for controlling said controlled element in accordance with the unbalance of the bridge, an anti-hunting means in the bridge, said means being energized in accordance with the degree of control exercised on the controlled element by the bridge, and operative to control the action of the bridge in anticipation of the consummation of the control effect upon the controlled element.

12. In a control system for apparatus having a controlling element, a controlled element and motive means for driving said controlled element in accordance with displacement of said controlling element, an electrical control bridge comprising two opposing juxtaposed E-shaped cores with a fixed minimum spacing between them, an armature in the space between the cores, means for moving the armature towards or away from either core, winding means on the outer legs of each core to magnetize each core, and a winding for each core to modify the effect of the outer leg winding means.

13. In a control system for apparatus having a controlling element, a controlled element and motive means for driving said controlled element in accordance with displacement of said controlling element, an electrical control bridge comprising two opposing juxtaposed E-shaped cores with a fixed minimum spacing between them, a floating armature in the space between the cores, means for moving the armature towards or away from either core, winding means on the outer legs of each core to magnetize the core, and a winding on the central leg of each core to modify the effect of the outer leg winding means.

14. In a control system for apparatus having a controlling element, a controlled element and motive means for driving said controlled element in accordance with displacement of said controlling element, a control bridge circuit comprising a source of energy equally subdivided to constitute two arms of the bridge, two electromagnetic impedance devices connected to the source to constitute the other two arms of the bridge, a movable magnetizable member movable in the magnetic circuits of the two impedance devices to vary their respective impedances, means including an unbalance circuit connected between the source and the impedance devices, and an auxiliary winding upon each impedance device for controlling the effective unbalance that would be otherwise established by the movable member.

FINN H. GULLIKSEN.